(12) United States Patent
Arora et al.

(10) Patent No.: US 9,841,877 B2
(45) Date of Patent: *Dec. 12, 2017

(54) UTILIZING COLOR DESCRIPTORS TO DETERMINE COLOR CONTENT OF IMAGES

(71) Applicant: A9.com, Inc., Palo Alto, CA (US)

(72) Inventors: Himanshu Arora, Sunnyvale, CA (US); Arnab Sanat Kumar Dhua, Seattle, WA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/017,156

(22) Filed: Feb. 5, 2016

(65) Prior Publication Data

US 2016/0155025 A1 Jun. 2, 2016

Related U.S. Application Data

(63) Continuation of application No. 13/892,666, filed on May 13, 2013.

(51) Int. Cl.

| | |
|---|---|
| *G06K 9/00* | (2006.01) |
| *G06F 3/0482* | (2013.01) |
| *G06K 9/62* | (2006.01) |
| *G06Q 30/06* | (2012.01) |
| *G06T 5/20* | (2006.01) |
| *G06K 9/46* | (2006.01) |

(Continued)

(52) U.S. Cl.
CPC ......... *G06F 3/0482* (2013.01); *G06K 9/4652* (2013.01); *G06K 9/6218* (2013.01); *G06Q 30/0643* (2013.01); *G06T 5/20* (2013.01); *G06T 7/11* (2017.01); *G06T 7/90* (2017.01)

(58) Field of Classification Search
CPC ......... G06F 17/30277; G06F 17/30247; G06F 17/3025; G06F 17/30274; G06K 9/4652
USPC .... 382/162, 170, 305, 165, 173, 171; 707/3, 707/100, E17.108; 705/27
See application file for complete search history.

(56) References Cited

U.S. PATENT DOCUMENTS

| | | | |
|---|---|---|---|
| 5,748,764 | A | 5/1998 | Benati et al. |
| 6,181,817 | B1 | 1/2001 | Zabih et al. |

(Continued)

OTHER PUBLICATIONS

"Image indexing using compressed colour histograms", IEE Proc.-Vis. Image Signal Process., vol. 147, No. 4, Aug. 2000.*

(Continued)

*Primary Examiner* — Mekonen Bekele
(74) *Attorney, Agent, or Firm* — Hogan Lovells US LLP (57) ABSTRACT

Various embodiments provide a method for determining color information for an image. For example, a color descriptor for an image can be determined and compared against color descriptors stored for each of a number of sample images, which each represent a color in a color space. Upon comparison, matching scores can be generated for a color match between the image and each respective sample image. In this example, the number of sample images with a matching score above a threshold value can be summed and the image can be assigned to a color associated with a highest frequency of the number of sample images. Accordingly, the assigned color of the image can then be used in a "query by color" search or a browse-by-color capability.

18 Claims, 7 Drawing Sheets

(51) Int. Cl.
*G06T 7/11* (2017.01)
*G06T 7/90* (2017.01)

(56) References Cited

U.S. PATENT DOCUMENTS

| | | | |
|---|---|---|---|
| 6,195,458 B1 | 2/2001 | Warnick et al. | |
| 6,246,804 B1 | 6/2001 | Sato et al. | |
| 6,741,655 B1 | 5/2004 | Chang et al. | |
| 6,754,675 B2 | 6/2004 | Abdel-Mottaleb et al. | |
| 7,337,455 B2 | 2/2008 | Agnihotri et al. | |
| 7,421,125 B1 | 9/2008 | Rees | |
| 7,809,189 B2 | 10/2010 | Cheng et al. | |
| 8,103,097 B2* | 1/2012 | Finlayson | G06T 5/009 345/596 |
| 8,520,935 B2 | 8/2013 | Wang et al. | |
| 8,576,241 B1 | 11/2013 | Kanter et al. | |
| 8,589,410 B2 | 11/2013 | Sud et al. | |
| 8,988,450 B1* | 3/2015 | Kanter | G06F 17/3025 345/589 |
| 9,064,149 B1* | 6/2015 | Dhua | G06K 9/00536 |
| 9,299,009 B1* | 3/2016 | Arora | G06F 3/0482 |
| 9,480,925 B2* | 11/2016 | Schmitt | A63F 13/63 |
| 9,704,033 B2* | 7/2017 | Dhua | G06K 9/00536 |
| 2001/0017940 A1 | 8/2001 | Kim et al. | |
| 2003/0174882 A1 | 9/2003 | Turpin | |
| 2003/0179213 A1* | 9/2003 | Liu | G06K 9/4652 345/619 |
| 2005/0280872 A1 | 12/2005 | Noel | |
| 2005/0280873 A1* | 12/2005 | Noel | H04N 1/40012 358/3.13 |
| 2006/0200475 A1 | 9/2006 | Das et al. | |
| 2008/0044081 A1 | 2/2008 | Lieb | |
| 2008/0046409 A1* | 2/2008 | Lieb | G06F 17/3025 |
| 2008/0046410 A1 | 2/2008 | Lieb | |
| 2008/0215548 A1* | 9/2008 | Ohashi | G06K 9/00664 |
| 2009/0154806 A1* | 6/2009 | Chang | G06F 17/30781 382/173 |
| 2009/0281925 A1* | 11/2009 | Winter | G06F 17/3025 705/26.1 |
| 2010/0225935 A1 | 9/2010 | Minchew et al. | |
| 2011/0013805 A1 | 1/2011 | Okada et al. | |
| 2011/0058748 A1 | 3/2011 | Trifonov et al. | |
| 2011/0188780 A1 | 8/2011 | Wang et al. | |
| 2011/0235902 A1* | 9/2011 | Chittar | G06F 17/3025 382/162 |
| 2013/0151535 A1 | 6/2013 | Dusberger et al. | |
| 2015/0278224 A1* | 10/2015 | Jaber | G06F 17/30247 707/749 |

OTHER PUBLICATIONS

USPTO Non-Final Office Action dated Jan. 28, 2015, for U.S. Appl. No. 13/892,666.
USPTO Final Office Action dated Sep. 16, 2015, for U.S. Appl. No. 13/892,666.
USPTO Notice of Allowance dated Dec. 2, 2015, for U.S. Appl. No. 13/892,666.
USPTO Non-Final Office Action dated Mar. 11, 2013, for U.S. Appl. No. 12/699,735.
USPTO Notice of Allowance dated Jul. 24, 2013, for U.S. Appl. No. 12/699,735.
USPTO Non-Final Office Action dated Dec. 16, 2013, for U.S. Appl. No. 14/071,557.
USPTO Final Office Action dated Apr. 29, 2014, for U.S. Appl. No. 14/071,557.
USPTO Notice of Allowance dated Nov. 7, 2014, for U.S. Appl. No. 14/071,557.
USPTO Non-Final Office Action dated Nov. 6, 2014, for U.S. Appl. No. 13/842,328.
USPTO Notice of Allowance dated Feb. 25, 2015 for U.S. Appl. No. 13/842,328.

* cited by examiner

UTILIZING COLOR DESCRIPTORS TO DETERMINE COLOR CONTENT OF IMAGES

CROSS-REFERENCES TO RELATED APPLICATIONS

This application is a continuation of U.S. application Ser. No. 13/892,666 entitled "UTILIZING COLOR DESCRIPTORS TO DETERMINE COLOR CONTENT OF IMAGES," filed May 13, 2013; which is incorporated herein by reference for all purposes.

BACKGROUND

Users are increasingly utilizing electronic devices to obtain various types of information. For example, a user wanting to purchase a pair of shoes might access an electronic marketplace in order to search the types of shoes offered through that marketplace. Unless the user knows an exact brand or style of shoe that the user wants, however, the user might have to search through hundreds or thousands of different shoes using various options to attempt to locate the type of shoe in which the user is interested. In many cases, the shoes are organized by categories such as "casual" and "formal" which only lend general guidance to the types of shoes in each of the categories. Color can also be an important cue for narrowing search results while browsing. In order to facilitate such a browsing experience, each product image needs to be tagged with the color of the product contained therein. However, manually tagging each and every product is not scalable or practical. Therefore, as technology advances, it can be advantageous to adapt the ways in which product information is made available to users and also the ways in which users access the same.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to determining information about image content. In particular, various embodiments provide a method for assigning color information to an image. For example, a color descriptor for an obtained image can be determined by analyzing the content of the image. The color descriptor then can be used for various purposes, such as to compare the descriptor against descriptors stored for each of a number of sample images, which each represent a color family in a color space. Upon comparison, a matching score can be determined for a color match between the obtained image and each of the sample images. In this example, the sample images with a matching score above a threshold value can be summed and the image can be assigned to a color associated with a highest total number of sample images. Alternatively, a highest matching score sum for sample images representing a respective color class can be assigned to the respective color family. Accordingly, the assigned color of the obtained image can then be used in a "query by color" search or a browse-by-color capability.

Various other functions and advantages are described and suggested below as may be provided in accordance with the various embodiments.

While browsing for products on an electronic marketplace, users may want to refine product search results according to characteristic attributes of the product they are seeking. These attributes can manifest in multiple forms. Such as augmenting the original ordered/unordered text query, specific attributes of a product category, product specific or user specific recommendations, and the like. Accordingly, visual attributes such as color, texture, shape, and the like can also be used to refine searches. A key differentiating aspect of visual attributes is their intuitiveness and ease of use for a user. Visual attributes require little or no domain knowledge about the product while searching for the same. For instance, many users may find it easier to search for a "blue colored shoe" of "athletic shape", as compared to a specific title that could be misspelled, forgotten, missing a key term, or the like.

Figure 1:
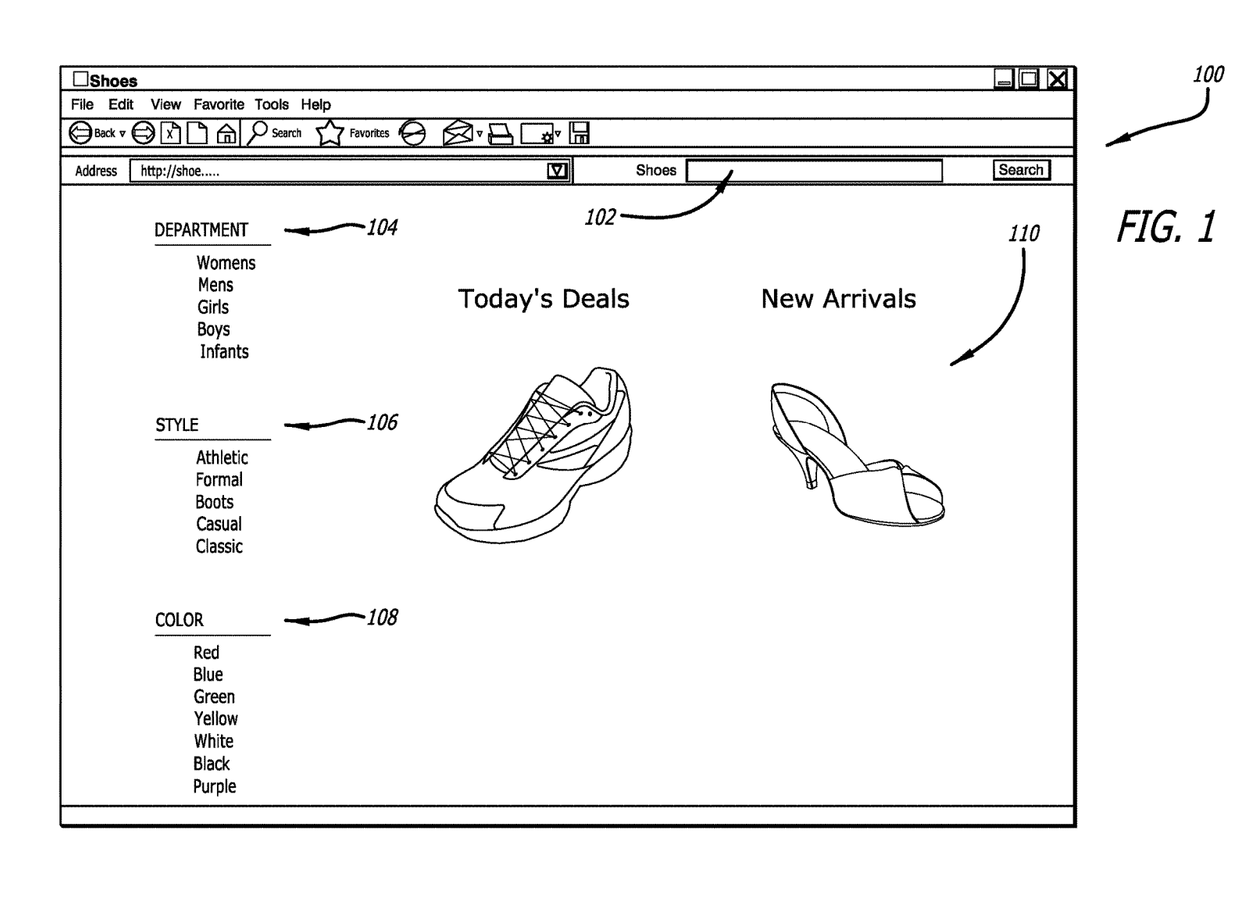
FIG. 1 illustrates an example interface that a user can use to locate an item in accordance with various embodiments.

FIG. 1 illustrates an example interface 100 that can be presented to a user searching for a product, such as a pair of shoes. In this example, the user might log onto a site that sells shoes, navigate to a page of an electronic marketplace that sells shoes, or otherwise access electronic content associated with various types of shoes. In this example, the user can utilize a number of conventional approaches in order to attempt to locate shoes that are of interest to the user. For example, the user can enter search terms into a search field 102 that can be compared against a search index to attempt to locate matching items. For example, the user might type in "men's formal shoes" to obtain search results matching some or all of those query terms. Alternatively, the user might select various categories or criteria in order to obtain a view type of item. For example, a user might be able to select from a first set of categories 104 in order to determine whether the search should include shoes for men, women, or children. The user also might select other criteria 106, such as a certain style in which the user is interested. Further, the user also might narrow a list of items by filtering by color 108. There may also be other selectable options 110 displayed as well, such as popular or seasonal shoes, or shoes in which the user might be interested based on past purchases or views, or other such information.

As discussed, color can be an important filter for narrowing search results while browsing, especially for apparel products such as shoes, dresses, and the like. To facilitate such a browsing experience, each product image would ideally be tagged with the color contained therein. Manually tagging all products, however, is not scalable and, hence, there is a need for an automated algorithm to analyze the visual content of these images and tag the same with the color contained therein.

In at least one embodiment, the color distribution of an object or product in an image can be described as a histogram over a number representative colors. For example, at least a portion of each red, green, and blue (RGB) pixel in an image can be mapped to one or more representative color families and the corresponding counts of each pixel can be aggregated to form a color vector descriptor of the image. The choice of representative colors is critical to both matching complexity and accuracy. For example, one possible choice includes all RGB color triplet combinations in the range [0-255]. This, however, leads to an overly large descriptor which is not only computationally intensive to match, but likely too specific for many color variations to be perceived by the human eye. For example, if two images with very similar colors have slightly different RGB values, their corresponding descriptors may return a low match score upon comparison. Conversely, the other extreme is choosing too few color representatives, where two image's corresponding descriptors may return a high match score for very different colors. Choosing a proper number of color representatives is, therefore, critical to properly describing and, subsequently, matching colors of an object in an image.

Color representatives can be chosen by essentially segment the entire color gamut into regions where all colors are considered equal. For example, an RGB-Space graph where each location within the 3-dimensional space representing a different combination of red, green, and blue, yielding all color possibilities can be utilized. Besides being computationally intensive, uniformly dividing the three-dimensional RGB space to determine color representatives is not necessarily desirable. Another consideration in choosing the color representatives is that they should respect perceptual boundaries between colors. For example, color variations at low intensity are often difficult for the human eye to disambiguate, so there does not need to be as many color representative segments or categories for low intensity regions. Further, the color content of each segment might be different, or yield different results, at different brightness values. A different segmenting method for choosing color representatives is, therefore, desirable.

Accordingly, it can be desirable to utilize a space, such as a Hue, Saturation, Value (HSV) Space, that more closely segments colors by how the human eye perceives the same and, therefore, enables the choosing of fewer more perceptually relevant color segments by segmenting the chromaticity component (hue and saturation) of each color from the brightness component (value). In order to choose color representatives from the HSV-space, the hue space can be uniformly divided into $N_h$ pure colors and $N_{sv}$ saturation and value pairs can be chosen for each hue, such that more saturation points are chosen for higher brightness values (Value). For example, more color representatives are, therefore, assigned to more saturation values for high brightness values relative to color representatives assigned saturation values for low brightness values. A few grayscale representatives with no color can also be chosen. Additionally, the points in HSV-space also correspond to points in the RGB space. Accordingly, in this example, there are $N_C = N_h * N_{sv}$ fine grained color representatives, each with a RGB value $C_i = (R_i, G_i, B_i)$.

As used herein, a color class can refer to a finite number of assignable output colors. These color classes can, in one example, be colors chosen by an electronic marketplace to describe and/or categorize products for narrowing product search results, as shown by the filtering by color 108 list in FIG. 1. A family color, as used herein, can refer to chosen divisions within the RGB color space. There may be some overlap and/or similarity between the color classes and color families; however, they each serve different purposes. For example, the color families are used to divide the color space in order to determine the color descriptors and an image, after its color content is determined using the color descriptors, is assigned to a color class.

Figure 2:
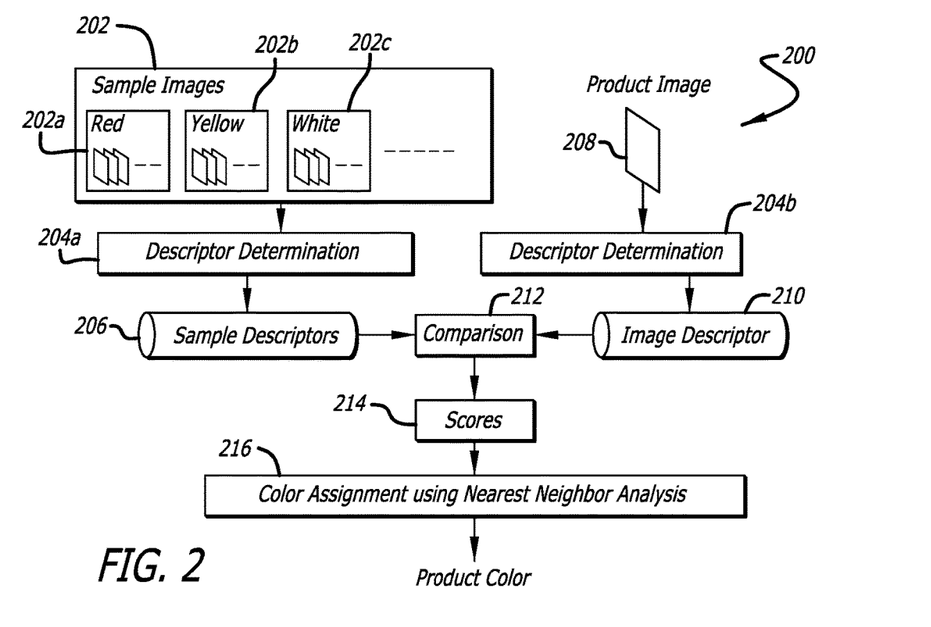
FIG. 2 illustrates an example system flow diagram for determining color content of an image that can be used in accordance with at least one embodiment.

In one possible implementation, a browse-by-color functionality can return products stored in a database containing the color selected from a fixed palette by the user. Given the set of results with pre-existing search criteria, such functionality can filter out products not containing this color. This can be accomplished by automatically assigning a subset of colors to each product image and filtering according to color specified by the user. FIG. 2 illustrates an example system flow diagram 200 for determining color content of an image that can be used in accordance with at least one embodiment. It should be understood that, for this and other processes discussed herein, there can be additional, fewer, or alternative steps, performed in similar or alternative steps, or in parallel, within the scope of the various embodiments unless otherwise stated. Towards enumerating the colors in an image, a description of that color is determined. In this example, sample product images 202 that contain a respective color are used to represent colors in a color space, which is more scalable than manually describing the color in terms of color values. In this example, the sample product images 202 include images containing various hues, shades, etc., of red 202a, yellow 202b, white 202c, and so on, for each color class.

Accordingly, a vector description describing the color content, of each sample image is determined 204a to create sample image descriptors 206 for each of the sample product images 202. As described in more detail below, the closest color among a defined set of fine color representative can be computed for each pixel of the product images 202. In this example, each of the pixels can be assigned a color ID, corresponding to their closest matching fine color representative, and at least one family color ID, corresponding one or more pure color families, to which the respective fine color representative belongs. A histogram of the color representatives and a histogram for the color families can then be computed and a single color vector descriptor for the image can be determined by combining the family histogram with the color representative histogram. The sample image descriptors 206 for each of the sample product images 202 are stored and used to compare against other images to determine the color information contained therein.

Upon obtaining a product image 208, for which color information is unassigned, tagged, or known, a vector description of the product image 208 is also determined 204b, as described above, and this color vector is compared 212 against the descriptors of each sample descriptor 206, and, as a result of the comparison, matching scores 214 are determined and returned for each sample images 202 relative to the product image 208. In this example, each of the matching scores represents a confidence value that a color of a respective sample image matches the color of the product image 208. Accordingly, these matching scores are used to determine the color to be assigned 216 to the product image 208 using a k-nearest neighbor voting processes. The k-nearest neighbor voting includes selecting k sample images with matching scores greater than a threshold score and tallying or counting the number of the selected sample image for each unique color or color class. Accordingly, the color with the most numerous sample images associated therewith is selected as the output color, in one example. The k-nearest neighbor voting will also be described in more detail below, along with a variation thereof. First, however, sample image selection will be described.

Sample Selection

In order to describe the color(s) contained in a product image, the meaning of each color needs to be defined. Manually defining or describing a color, however, is difficult because 1) the colors might appear in multiple shades and tones; 2) a single color might be a non-trivial mixture of multiple pure colors (e.g., sparkling gold contains shades of yellow, green, white, and black); 3) imaging conditions such as illumination, contrast, or viewpoint might impact color distributions; and 4) each product type might have a bias towards some colors that need to be accounted for (e.g., most shoes have black or brown soles), which should not be used to assign the actual color.

In one example, for each color, product images are selected as samples to represent or as a way to describe colors in a color space. The product images may contain only one color, but may also contain artifacts, such as different shades of a color, illumination, shadows, viewpoints, and the like. Since it can be desirable to detect a color of an arbitrary image under these conditions and with such artifacts, the samples provide a useful model for the same.

Accordingly, special attention is paid to choosing sample images representing colors near color class boundaries, particularly for colors that are commonly confused (i.e., brown, maroon, red, etc.). In various embodiments, the color space can be divided into N color families (i.e., red family, blue family, green family, yellow family, purple family, orange family, etc.) and within each color family there could be M shades, hues, or variations of the respective family color. For example, the color 'lime' lies near the boundary of yellow and green, so green and yellow sample images lying close to this boundary are chosen. The number of shades, hues, or variations for each family does not necessarily need to be the same and can be different, however, a similar number of sample images for each color class is chosen in an attempt to prevent bias in favor of a particular color in the color space.

Color Descriptor Determination

Figure 3:
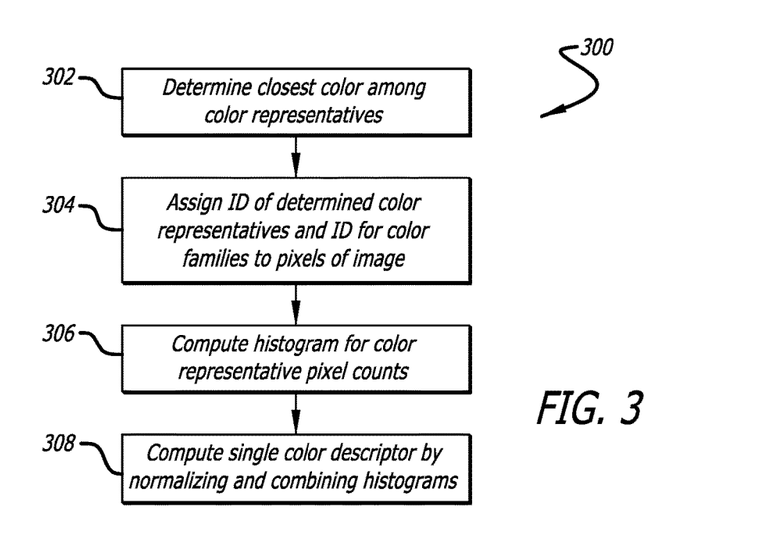
FIG. 3 illustrates an example process for determining a color descriptor for an image that can be used in accordance with at least one embodiment.

For each image (sample or obtained), a descriptor that captures the image's global color distribution is determined for describing color variation in an image as a histogram by assigning a saturation value and a brightness value to a plurality of color hues. FIG. 3 illustrates an example process 300 for determining a color descriptor that can be used in accordance with various embodiments. In this example, a set of N perceptually salient colors is predefined as a color space. Each RGB value of these salient colors is divided into a set of color families (e.g., all blue shades are included in the blue family, light green shades in the green family, and so on). Accordingly, colors at or near boundaries of adjacent color families may be included in two color families. Fine color representatives are determined to describe color variation in an image as a histogram by assigning a saturation value and a brightness value to a plurality of color hues for each of a set of colors. For each pixel in the image, the closest color among the fine color representatives is computed 302. Each of the pixels, in one example, can be assigned to a color ID for a respective closest matching fine color representative and to at least one pure color family with a corresponding family ID that the fine color representative belongs to. In this example, a global histogram of the color representatives can be computed 306 for at least a portion of the pixels. Additionally, a color family histogram is also computed. A single color vector descriptor for the image is computed 308 by normalizing and combining (or concatenating) the color family histogram with the color representative histogram with a weighting factor.

Further, the descriptor can be scaled to have a unit Euclidean norm. In one example, the color family histogram can be weighted higher, 1.2 for example, when combining the histograms than the color representative histogram, 1.0, for example. There are some applications, however, where the color family histogram isn't always weighted higher. For example, the color representative histogram can be weighted higher when determining a visual similarity between two items or images, as will be described below.

In at least one embodiment, the computation of the closest color among the fine color representatives can be performed in a color space other than RGB space or HSV space, as discussed above. For example, Lab color space (CIELAB), which incorporates a dimension L for lightness and 'a' and 'b' for color-opponent dimensions could also be utilized for assigning image pixels to the fine colors. As used herein, a color opponent is associated with a process in color theory that suggests that color perception is controlled by the activity of two opponent systems; a blue-yellow mechanism and a red-green mechanism. Accordingly, the HSV and Lab color spaces can be utilized for different purposes. For example, the HSV space can be used to lay out the fine colors representatives and Lab space to compute distances.

Color Descriptor Comparison

Figure 4:
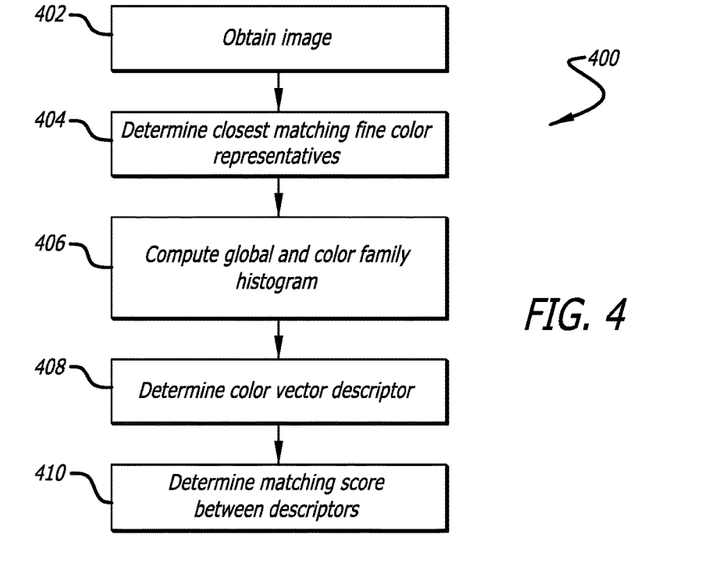
FIG. 4 illustrates an example process for matching color descriptors of two images that can be used in accordance with at least one embodiment.

In order to compare the color content of two images, their descriptors are first computed as described above, and the dot product, or any other distance metric, between these descriptors can be used as a measure of color similarity between the two images. FIG. 4 illustrates an example process 400 for comparing color descriptors that can be used in accordance with various embodiments. This example illustrates a situation where sample images have already been selected and the corresponding color descriptors for each of the sample images has been stored in a database for use when an image, having unassigned color information, is obtained for color assignment. In this example, an image to compare to the sample images stored in the database is obtained 402. The closest matching fine color representatives for each pixel of the obtained image are determined 404. As discussed elsewhere herein, a global histogram of the closest matching fine color representatives for the image and corresponding family histogram is determined 406 and a color descriptor is computed 408 from a combination of the global and family histograms. Accordingly, a matching score or similarity measure is determined 410 by computing the dot product (or any other suitable distance metric) between each of the sample descriptors and the vector descriptor for the obtained image. The matching score signifies a confidence level that the color contained in the obtained image matches the color of a respective sample image. After the color descriptor for the obtained image is compared to each of the sample image color descriptors, a k-nearest neighbor voting algorithm is used to infer the output color(s) using the matching scores further described below.

K-Nearest Neighbor Voting

Since colors corresponding to high scoring samples have a higher likelihood of being the correct color in the image, the k highest scoring samples, in one example, are selected. Alternatively, k samples with matching scores greater than a threshold score could be selected. A tally or vote for the number of each sample image for a respective color class is taken and the color class with most numerous sample images having matching scores above the threshold value can be selected as the output color. Such nearest neighbor based selection is good if the samples densely sample the color descriptor space. This, however, is not necessarily true in practice since the color space is huge.

Figure 5A:
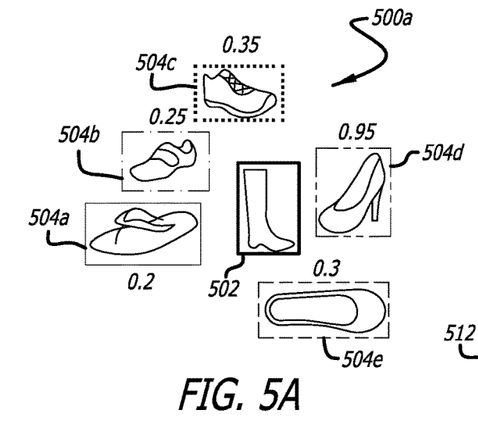
FIGS. 5A, 5B, and 5C illustrate example products used for describing k-nearest neighbor voting in accordance with at least one embodiment.
Figure 5B:
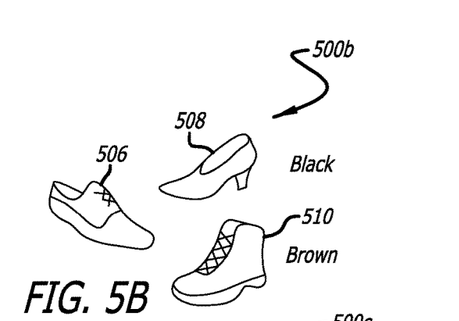
Figure 5C:
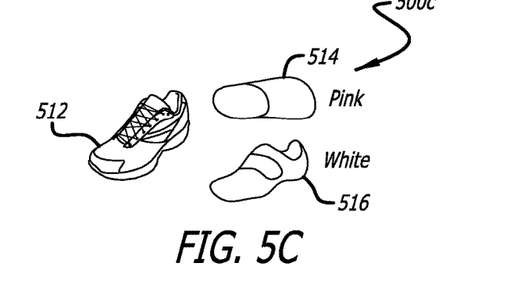

FIGS. 5A-5C illustrate a couple of ambiguities that can be created due to sparse sample images sampling of color space. FIG. 5A illustrates a case 500*a* where the color space in unevenly represented by the sample images. In this example, the shoe in obtained image 502 is near the border between yellow and green in color space, but would be perceived by the human eye as being closer to yellow. In this example, the surrounding images are the closest matching samples, which include images for three green shoes (504*a*, 504*b*, 504*c*) and two yellow shoes (504*d*, 504*e*). In this example, the shoe in the obtained image 502 is yellow; shoe 504*a* with a matching score of 0.2 is a part of, or has previously been assigned to, the green color family; shoe 504*b* and shoe 504*c* with matching scores of 0.25 and 0.35 respectively have also been assigned to the green color family; and shoe 504*d* and shoe 504*e* with matching scores of 0.95 and 0.3 respectively have been assigned to the yellow color family. A count based voting will assign the color as green, which, in this example, is incorrect. If we add up the scores, however, yellow clearly wins. Accordingly, had the color space been more densely sampled by the sample images, there would have been more samples with a color closer to the color of image 502, and simple voting would have sufficed.

In a less densely populated color space, the scores of the samples can be used not just for selecting the colors, but as soft likelihoods of assigning them to a given image. Accordingly, the scores for each output color class among the top k scoring samples can be summed and this sum can be used to decide the most frequent color classes. The sums for each respective color class above a threshold can be used to choose colors for the given image. Thus, the sample images that are closer to the given image are given a higher weight as compared to the ones further apart, as shown in FIG. 5A. This soft voting can, in some examples, deal with the case when the samples do not densely sample the color space.

Ambiguous Color Clustering

The above color selection mechanisms lead to an inherent ambiguity between images at the boundary of two pure colors, and, a multicolored image. FIGS. 5B and 5C illustrate two cases 500*b* and 500*c* where an image of a product on boundary of two color classes may have a high matching score for sample images associated with two different color classes, and hence the scores get divided between these colors. For an image of a multicolored shoe, as shown in FIG. 5C where product image of shoe 512 contains equal parts white and pink, the color descriptor (histogram) can contain substantially equal parts of both colors and will, therefore, return relatively high matching scores for the respective sample images of both colors (514, 516). In another quite different example that yields similar matching score results, is case 500*b* shown in FIG. 5B. In this example, product image of shoe 506 is a dark brown color that is substantially similar to both brown shoe 508 and black shoe 510 sample images. In this example, thus, the matching score results for brown and black will both be relatively high. Different outcomes, however, are needed for each of cases 500*b* and 500*c* since the product image 506 has uniform color and hence should be assigned to a single color class, either one of black or brown, but product image 512 is multicolored, and hence should be assigned to multiple color classes, both white and pink. Although the matching scores results for both cases in FIGS. 5B and 5C are similar, the differentiating factor between the two cases is that while the sample images in FIG. 5B (508, 510) are similar to each other, sample images in FIG. 5C (514, 516) are not similar at all.

Accordingly, the sample images for the multicolored product image 512 are going to be quite different, however, the matching score results will appear to be very similar for the boundary color case 500*b*, as if the color of the shoes is somewhere near the boundary between white and pink. Since the sample images for the multicolored case 500*c* are going to be quite different and the sample images of the single color brown/black case 500*b* will be similar, this fact can be used to disambiguate between the two cases 500*b* and 500*c*. Among the sample images that return relatively high matching scores for a given image, the sample images for a relatively single colored shoe (case 500*b*) should be very similar and the sample images for a multicolored shoe (case 500*c*) should be quite different. Accordingly, in order to distinguish between these two cases 500*b* and 500*c*, the descriptors for each sample image with matching scores above the threshold can be compared to each other. If the matching scores are high between the sample images, the image is assigned a single color. If the matching scores are low between the sample images, two or more colors associated with color classes of the sample images can be assigned to the image.

To this end, the sample images can be clustered or grouped according to color similarity. For example, the dark brown and black shoe, as discussed above, could be included in the same cluster or group since they are both quite dark, but the white and the pink shoe, however, would likely not be found to be similar and, thus, would likely not be grouped together. Accordingly, the k highest sample images can be selected where each has a corresponding matching score and output color. The sample images, therefore, have indices $\{i_1, i_2, i_3 \ldots i_k\}$, outputs $\{o_1, o_2, o_3 \ldots o_k\}$, and scores $\{s_1, s_2, s_3 \ldots s_k\}$, a score matrix using these indices is computed and the scores can be used to cluster the sample images. Any algorithm can be used to perform the clustering, such as, for example, a distance based connected components algorithm. Soft voting of the k nearest neighbors can then be performed separately for each cluster, where a color is assigned to each cluster. Accordingly, a score threshold within each color cluster can be performed and the image can be assigned to color classes associated with color clusters above the threshold value.

Figure 6:
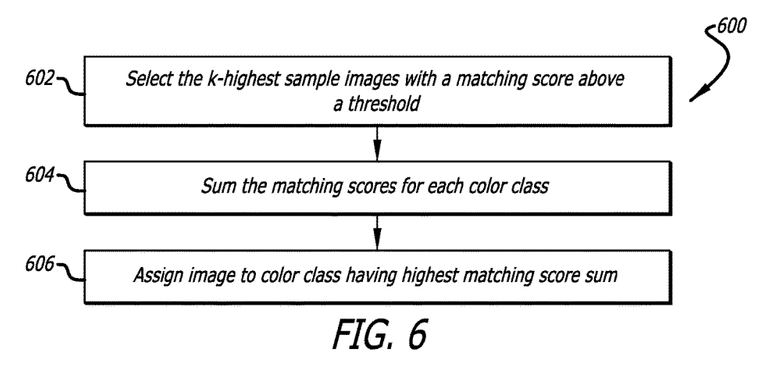
FIG. 6 illustrates an example process for k-nearest neighbor voting that can be used in accordance with at least one embodiment.

FIG. 6 illustrates an example process 600 for nearest neighbor voting that can be used in accordance with various embodiments. Upon receiving a number of matching scores corresponding to a match between an image in question and stored sample images representing colors of a color space, the k-highest sample images are selected 602. The k-highest can either refer to a fixed number of highest sample images or it can refer to any number of sample images having a matching score above a threshold matching score. In this example, the matching scores for each color are summed 604. Alternatively, the number of each sample for a respective color can be tallied. Accordingly, the image is assigned to the color having the highest matching score sum or the highest number of sample images for a respective color 606.

Figure 7:
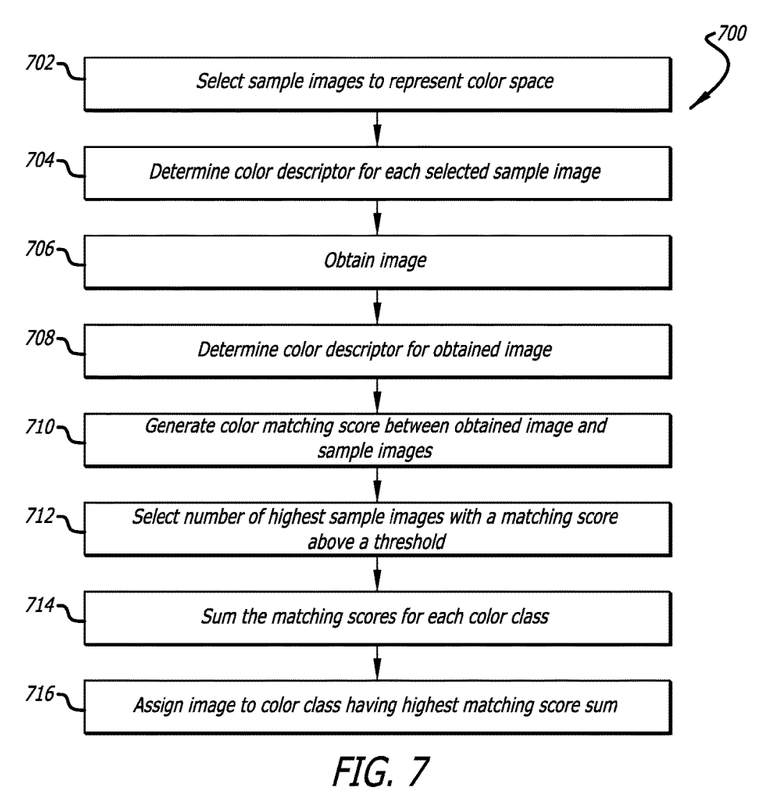
FIG. 7 illustrates an example process for determining color content of an image that can be used in accordance with at least one embodiment.

Accordingly, FIG. 7 illustrates an example process 700 for querying products using color learned from a sample image database that can be used in accordance with various embodiments. It should be understood that, for this and other processes discussed herein, there can be additional, fewer, or alternative steps, performed in similar or alternative steps, or in parallel, within the scope of the various embodiments unless otherwise stated. In this example, one or more sample images are selected to represent a color space composed of a plurality of color families 702. Each color family, in this example, is represented by multiple sample images covering multiple shades of each color in a color space against which a query image is compared to in order to determine the color contained in the query image. A color descriptor is determined for each of the sample images 704. Upon obtaining a query image 706, a color descriptor for the query image is determined 708 against which to compare to color descriptors of the sample images. Accordingly, a color matching score for each of the sample images is generated 710 for its respective match to the query image upon comparison. In this example, a number of the sample images with matching scores above a threshold score are selected 712. For each color class, the color matching scores corresponding to their representative sample images are summed 714. In this example, the query image is assigned the color of the color class with the highest matching score sum 716.

Figure 8:
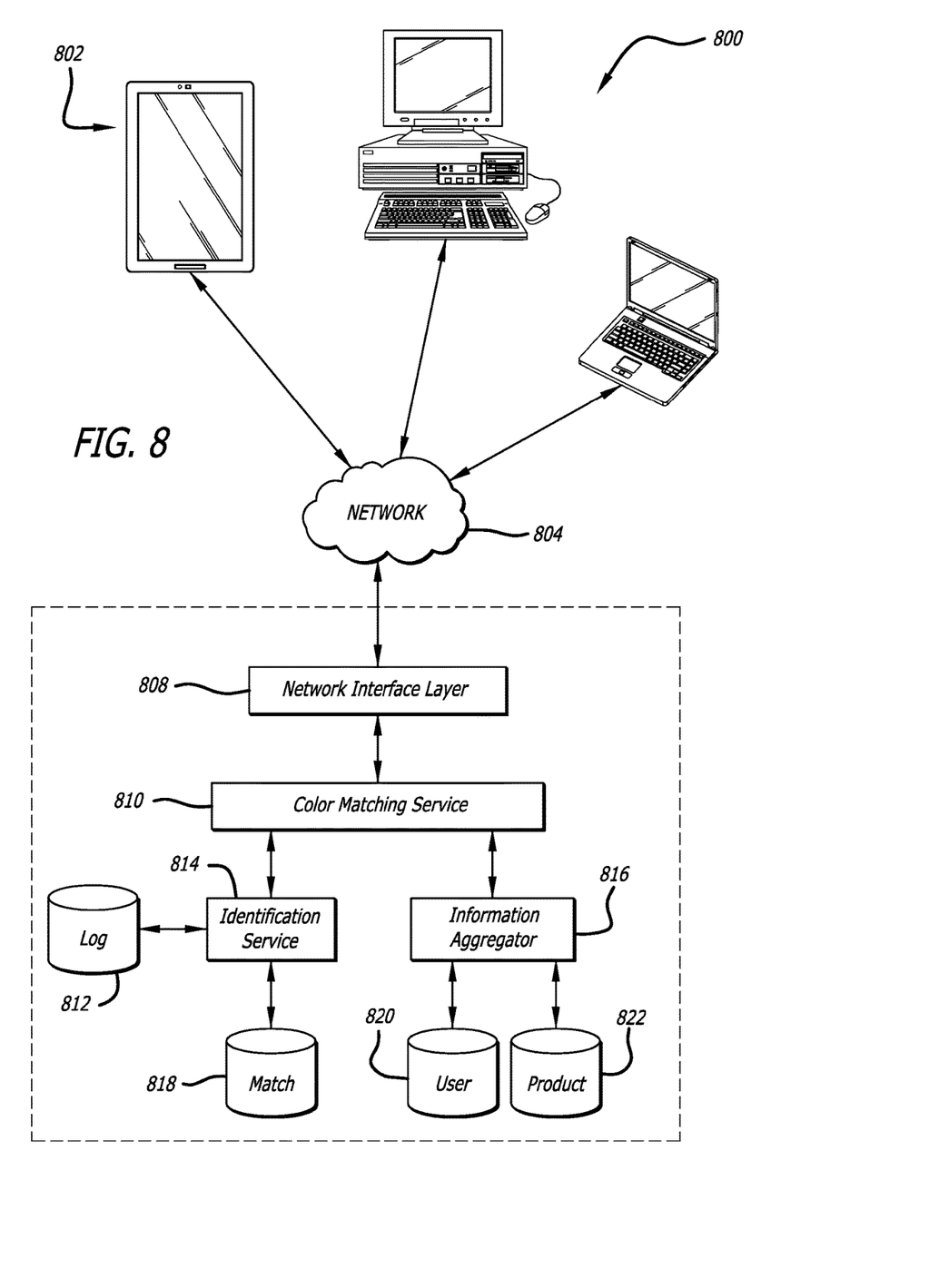
FIG. 8 illustrates an environment in which various embodiments can be implemented.

It will be helpful to have reference to an example environment configured to create color histogram descriptors and to use the descriptors to automatically tag, search, and filter content, in accordance with at least one embodiment. FIG. 8 illustrates an example environment 800 in which information such as search criteria and item color can be submitted by a computing device in order to attempt to obtain information for matching items as a set of search results or other such content. In this example, a user is able to specify an item including a color and other such information using at least one computing device 802. For example, the computing device can send at least a portion of information across at least one appropriate network 804, such as may include the Internet, a local area network (LAN), a cellular network, and the like. The request can be sent to an appropriate content provider 806, as may provide one or more services, systems, or applications for processing such requests.

In this example, the request is received to a network interface layer 808 of the content provider 806. The network interface layer can include any appropriate components known or used to receive requests from across a network, such as may include one or more application programming interfaces (APIs) or other such interfaces for receiving such requests. The network interface layer 808 might be owned and operated by the provider, or leveraged by the provider as part of a shared resource or "cloud" offering. The network interface layer can receive and analyze the request, and cause at least a portion of the information in the request to be directed to an appropriate system or service, such as a color matching service 810 as illustrated in FIG. 8. A color matching service in this example includes components operable to receive color data for a type of item, analyze the color data of an image, tag the images with color tags, and the like. Further, the system may also return information relating to people, products, places, or things that are determined to match the color data with etc.

The color matching service 810 in this example can cause information to be sent to at least one identification service 814, device, system, or module that is operable to analyze the contour data and attempt to locate one or more matches. In at least some embodiments, an identification service 814 will process the received data, such as to determine specific representative color points, then compare the processed data against data stored in a matching data store 820 or other such location. The data in an image matching data store 820 might be indexed and/or processed to facilitate with matching, as is known for such purposes.

The color matching service 810 can receive information from each contacted identification service 814 as to whether one or more matches could be found with at least a threshold level of confidence, for example, and can receive any appropriate information for a located potential match. The information from each identification service can be analyzed and/or processed by one or more applications of the color matching service, such as to determine data useful in obtaining information for each of the potential matches or products to provide to the user. For example, a color matching service might receive bar codes, product identifiers, or any other types of data from the identification service(s), and might process that data to be provided to a service such as an information aggregator service 816 that is capable of locating descriptions or other content related to the located potential matches.

In at least some embodiments, an information aggregator might be associated with an entity that provides an electronic marketplace, or otherwise provides items or content for consumption (e.g., purchase, rent, lease, or download) by various customers. Although products and electronic commerce are presented in this and other examples presented, it should be understood that these are merely examples and that approaches presented in the present disclosure can relate to any appropriate types of objects or information as discussed and suggested elsewhere herein. In such an instance, the information aggregator service 816 can utilize the aggregated data from the color matching service 810 to attempt to locate products, in a product data store 824 or other such location, which are offered through the marketplace and that match, or are otherwise related to, the potential match information. For example, if the identification service identifies a type or brand of boot with the desired color, the information aggregator can attempt to determine whether instances of that type or brand of boot are offered through the marketplace, or at least for which information is available through the marketplace. In at least some embodiments, the information aggregator can utilize one or more suggestion algorithms or other such approaches to attempt to determine related elements that might be of interest based on the determined matches. In some embodiments, the information aggregator can return various types of data (or metadata) to the environmental information service, as may include item description, availability, reviews, and the like. In other embodiments, the information aggregator might instead return information such as a product identifier, uniform resource locator (URL), or other such digital entity enabling a browser or other interface on the computing device 802 to obtain information for one or more products, etc. The information aggregator can also utilize the aggregated data to obtain various other types of data as well. Information for located matches also can be stored in a user data store 822 of other such location, which can be used to assist in determining future potential matches or suggestions that might be of interest to the user. Various other types of information can be returned as well within the scope of the various embodiments.

The color matching service 810 can bundle at least a portion of the information for the potential matches to send to the client as part of one or more messages or responses to the original request. In some embodiments, the information from the identification services might arrive at different times, as different types of information might take longer to analyze, etc. In these cases, the matching service might send multiple messages to the client device as the information becomes available. The potential matches located by the various identification services can be written to a log data store 812 or other such location in order to assist with future matches or suggestions, as well as to help rate a performance of a given identification service. As should be understood, each service can include one or more computing components, such as at least one server, as well as other components known for providing services, as may include one or more APIs, data storage, and other appropriate hardware and software components. It should be understood that, although the identification services are shown to be part of the provider environment 806 in FIG. 8, that one or more of these identification services might be operated by third parties that offer these services to the provider.

Figure 9A:
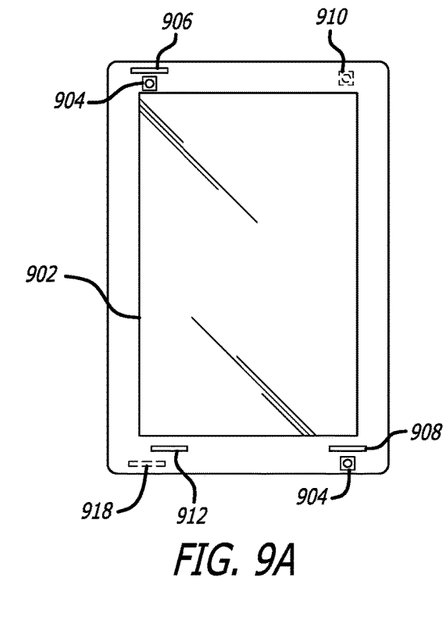
FIGS. 9A and 9B illustrate an example computing device that can be used to implement aspects of various embodiments.
Figure 9B:
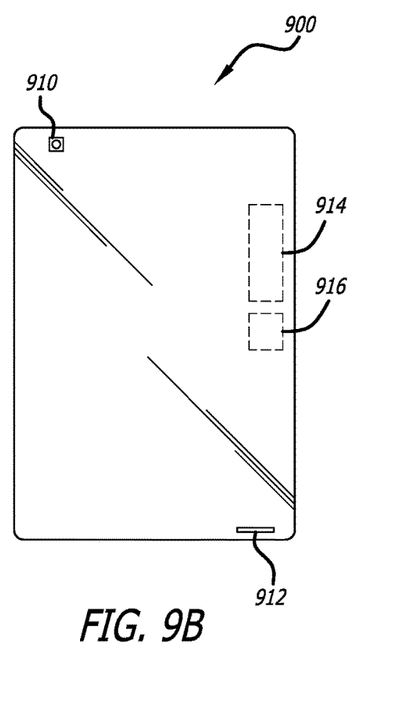

FIGS. 9A and 9B illustrate front and back views, respectively, of an example electronic computing device 900 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 900 has a display screen 902 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 904 on the front of the device and at least one image capture element 910 on the back of the device. It should be understood, however, that image capture elements could also, or alternatively, be placed on the sides or corners of the device, and that there can be any appropriate number of capture elements of similar or different types. Each image capture element 904 and 910 may be, for example, a camera, a charge-coupled device (CCD), a motion detection sensor or an infrared sensor, or other image capturing technology.

As discussed, the device can use the images (e.g., still or video) captured from the imaging elements 904 and 910 to generate a three-dimensional simulation of the surrounding environment (e.g., a virtual reality of the surrounding environment for display on the display element of the device). Further, the device can utilize outputs from at least one of the image capture elements 904 and 910 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 908 on the front side, one microphone 912 on the back, and one microphone 906 on or near a top or side of the device. In some devices there may be only one microphone, while in other devices there might be at least one microphone on each side and/or corner of the device, or in other appropriate locations.

The device 900 in this example also includes one or more orientation- or position-determining elements 918 operable to provide information such as a position, direction, motion, or orientation of the device. These elements can include, for example, accelerometers, inertial sensors, electronic gyroscopes, and electronic compasses.

The example device also includes at least one communication mechanism 914, such as may include at least one wired or wireless component operable to communicate with one or more electronic devices. The device also includes a power system 916, such as may include a battery operable to be recharged through conventional plug-in approaches, or through other approaches such as capacitive charging through proximity with a power mat or other such device. Various other elements and/or combinations are possible as well within the scope of various embodiments.

Figure 10:
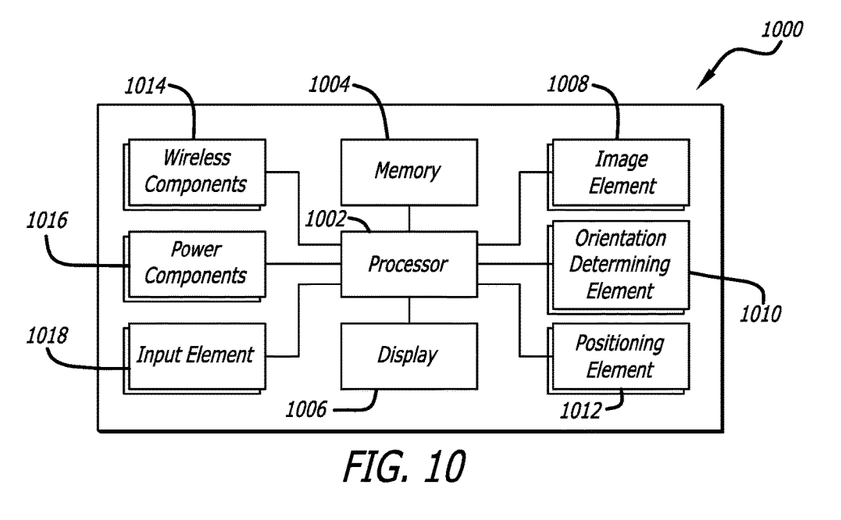
FIG. 10 illustrates example components that can be used with a device such as that illustrated in FIGS. 9A and 9B.

FIG. 10 illustrates a set of basic components of an electronic computing device 1000 such as the device 900 described with respect to FIG. 9. In this example, the device includes at least one processing unit 1002 for executing instructions that can be stored in a memory device or element 1004. As would be apparent to one of ordinary skill in the art, the device can include many types of memory, data storage, or computer-readable media, such as a first data storage for program instructions for execution by the processing unit(s) 1002, the same or separate storage can be used for images or data, a removable memory can be available for sharing information with other devices, and any number of communication approaches can be available for sharing with other devices.

The device typically will include some type of display element 1006, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1008, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1000 also includes at least one orientation determining element 1010 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1000. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1012 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1014 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1016, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 1018 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 11:
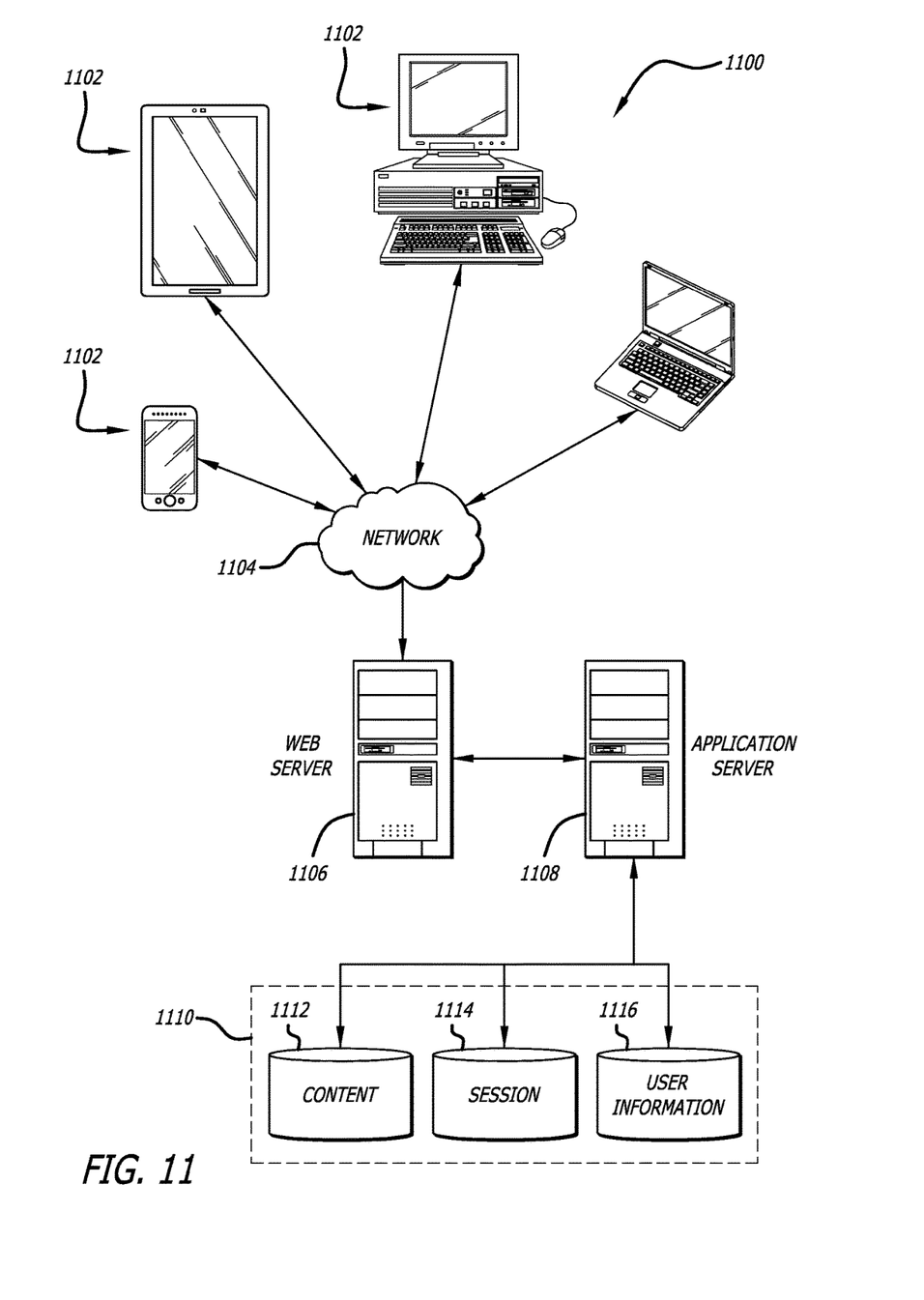
FIG. 11 illustrates an environment in which various embodiments can be implemented.

As discussed, different approaches can be implemented in various environments in accordance with the described embodiments. For example, FIG. 11 illustrates an example of an environment 1100 for implementing aspects in accordance with various embodiments. As will be appreciated, although a Web-based environment is used for purposes of explanation, different environments may be used, as appropriate, to implement various embodiments. The system includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1106 for receiving requests and serving content in response thereto, although for other networks, an alternative device serving a similar purpose could be used, as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1106 in the form of HTML, XML or another appropriate structured language in this example. The handling of all requests and responses, as well as the delivery of content between the client device 1102 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing content (e.g., production data) 1112 and user information 1116, which can be used to serve content for the production side. The data store is also shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving a query for an item offered through an electronic marketplace, the query including an image that includes a representation of the item and an indication of a product type associated with the item;
analyzing the image to identify an area of the image that includes the representation of the item, the area of the image including a plurality of pixels;
determining a closest fine color for individual pixels of the plurality of pixels, individual fine colors being associated with a color family;
computing a fine color histogram and a family color histogram for the area based at least in part on the closest fine color for individual pixels and associated color family;
computing a color descriptor for the representation of the item based at least in part on a combination of the fine color histogram and the family color histogram;
comparing the color descriptor to an electronic catalog of color descriptors to determine a color class of the representation of the item;
providing the color class and product type to an identification service, the identification service used to generate a ranking score based and least in part on a matching of the color class to a respective color class associated with a respective item of a subset of the items offered by the electronic marketplace; and
retrieving the subset of the items for display, each item of the subset of the items being arranged based at least in part on a respective color class.

2. The computer-implemented method of claim 1, further comprising:
displaying a plurality of color filters with the subset of the items;
receiving a selection of one of the plurality of color filters to enable a color filter corresponding to a color class; and
displaying items of the subset of the items associated with a color class matching the color class of the color filter.

3. The computer-implemented method of claim 1, further comprising:
determining supplemental content associated with a color class matching the color class of the item offered through the electronic marketplace; and
displaying, with the subset of the items, the supplemental content.

4. The computer-implemented method of claim 1, wherein the image that includes the representation of the item is received from a mobile device interface.

5. The computer-implemented method of claim 1, further comprising:
identifying a number of highest scoring sample images associated with a respective color matching score above a threshold matching score;
grouping each of the sample images of the number of highest scoring sample images into a class color cluster;
summing color matching scores for each of the sample images in each class color cluster; and
associating the image to the color class associated with a class color cluster having a color matching score sum above a threshold value.

6. The computer-implemented method of claim 5, further comprising:
selecting a plurality of sample images to represent each color class of a color space;
determining respective color descriptors for each of the plurality of sample images; and
storing the color descriptors for the plurality of sample images in the electronic catalog of color descriptors to compare to the image for the color descriptor for the image.

7. The computer-implemented method of claim 6, wherein at least one sample image represents a color near a boundary between two adjacent color classes.

8. The computer-implemented method of claim 6, wherein grouping each of the sample images further includes:
comparing a color descriptor of each sample image of the plurality of sample images to color descriptors of the number of highest scoring sample images to determine a similarity between each of the sample images.

9. A computing device, comprising:
a processor; and
memory including instructions that, when executed by the processor, cause the computing device to:
receive a query for an item offered through an electronic marketplace, the query including an image that includes a representation of the item and an indication of a product type associated with the item;
analyze the image to identify an area of the image that includes the representation of the item, the area of the image including a plurality of pixels;
determine a closest fine color for individual pixels of the plurality of pixels, individual fine colors being associated with a color family;
compute a fine color histogram and a family color histogram for the area based at least in part on the closest fine color for individual pixels and associated color family;
compute a color descriptor for the representation of the item based at least in part on a combination of the fine color histogram and the family color histogram;
compare the color descriptor to an electronic catalog of color descriptors to determine a color class of the representation of the item;

provide the color class and product type to an identification service, the identification service used to generate a ranking score based and least in part on a matching of the color class to a respective color class associated with a respective item of a subset of the items offered by the electronic marketplace; and retrieve the subset of the items for display, each item of the subset of the items being arranged based at least in part on a respective color class.

10. The computing device of claim 9, wherein the instructions, when executed by the processor, further enable the computing device to:

identify a number of highest scoring sample images associated with a respective color matching score above a threshold matching score;

group each of the sample images of the number of highest scoring sample images into a class color cluster;

sum the color matching scores for each of the sample images in each class color cluster to determine a plurality of color matching scores; and associate the image to the color class associated with a class color cluster having a color matching score sum above a threshold value.

11. The computing device of claim 10, wherein the instructions, when executed by the processor, further enable the computing device to:

compute a dot product between the color descriptor of the image and each of the color descriptors for the number of highest scoring sample images to generate the plurality of color matching scores.

12. The computing device of claim 9, wherein the instructions, when executed by the processor, further enable the computing device to:

display a plurality of color filters with the subset of the items;

receive a selection of one of the plurality of color filters;

enable a color filter based at least in part on the selection; and display items of the subset of the items associated with a color class matching a color class of the color filter.

13. The computing device of claim 9, wherein the instructions, when executed by the processor, further enable the computing device to:

determine supplemental content associated with a color class matching the color class of the item offered through the electronic marketplace; and display, with the subset of the items, the supplemental content.

14. The computing device of claim 9, wherein the image that includes the representation of the item is received from a mobile device interface.

15. A non-transitory computer-readable storage medium storing instructions that, when executed by at least one processor, enable a computing device to:

receive a query for an item offered through an electronic marketplace, the query including an image that includes a representation of the item and an indication of a product type associated with the item;

analyze the image to identify an area of the image that includes the representation of the item, the area of the image including a plurality of pixels;

determine a closest fine color for individual pixels of the plurality of pixels, individual fine colors being associated with a color family;

compute a fine color histogram and a family color histogram for the area based at least in part on the closest fine color for individual pixels and associated color family;

compute a color descriptor for the representation of the item based at least in part on a combination of the fine color histogram and the family color histogram;

compare the color descriptor to an electronic catalog of color descriptors to determine a color class of the representation of the item;

provide the color class and product type to an identification service, the identification service used to generate a ranking score based and least in part on a matching of the color class to a respective color class associated with a respective item of a subset of the items offered by the electronic marketplace; and retrieve the subset of the items for display, each item of the subset of the items being arranged based at least in part on a respective color class.

16. The non-transitory computer-readable storage medium of claim 15, wherein the instructions that, when executed by the at least one processor, further enable the computing device to:

display a plurality of color filters with the subset of the items;

receive a selection of one of the plurality of color filters;

enable a color filter based at least in part on the selection; and display items of the subset of the items associated with a color class matching a color class of the color filter.

17. The non-transitory computer-readable storage medium of claim 15, wherein the instructions that, when executed by the at least one processor, further enable the computing device to:

determine supplemental content associated with a color class matching the color class of the item offered through the electronic marketplace; and display, with the subset of the items, the supplemental content.

18. The non-transitory computer-readable storage medium of claim 15, wherein the instructions that, when executed by the at least one processor, further enable the computing device to:

identify a number of highest scoring sample images associated with a respective color matching score above a threshold matching score;

group each of the sample images of the number of highest scoring sample images into a class color cluster;

sum the color matching scores for each of the sample images in each class color cluster; and associate the image to the color class associated with a class color cluster having a color matching score sum above a threshold value.

* * * * *